(12) United States Patent
Usuda et al.

(10) Patent No.: US 8,060,023 B2
(45) Date of Patent: Nov. 15, 2011

(54) MOBILE COMMUNICATION SYSTEM, RADIO BASE STATION, AND MOBILE STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 387 days.

(21) Appl. No.: 11/667,270

(22) PCT Filed: Nov. 9, 2005

(86) PCT No.: PCT/JP2005/020553
§ 371 (c)(1),
(2), (4) Date: Nov. 1, 2007

(87) PCT Pub. No.: WO2006/051824
PCT Pub. Date: May 18, 2006

(65) Prior Publication Data
US 2008/0056129 A1 Mar. 6, 2008

(30) Foreign Application Priority Data
Nov. 9, 2004 (JP) ................................. 2004-325168

(51) Int. Cl.
*H04B 1/00* (2006.01)
(52) U.S. Cl. ............ 455/69; 455/39; 370/231; 370/278; 714/748; 714/749
(58) Field of Classification Search .................. 370/229, 370/232, 233, 328–335, 395.4, 278, 231; 455/522, 69, 512, 513, 39; 714/747–750
See application file for complete search history.

(56) References Cited

U.S. PATENT DOCUMENTS

| | | | | |
|---|---|---|---|---|
| 4,479,215 A * | 10/1984 | Baker | ............................ | 714/749 |
| 5,881,069 A * | 3/1999 | Cannon et al. | ................. | 714/748 |
| 5,896,402 A * | 4/1999 | Kurobe et al. | ................. | 714/748 |
| 5,923,662 A * | 7/1999 | Stirling et al. | ................. | 370/432 |
| 6,392,993 B1 * | 5/2002 | Hamilton et al. | ............. | 370/230 |

(Continued)

FOREIGN PATENT DOCUMENTS

EP 1 006 689 A2 6/2000

(Continued)

OTHER PUBLICATIONS

3rd Generation Partnership Project; Technical Specification Group Radio Access Network; Feasibility Study for Enhanced Uplink for UTRA FDD (Release 6), 3GPP TR 25.896 V6.0.0 (Mar. 2004), p. 1-p. 179.

(Continued)

*Primary Examiner* — Nick Corsaro
*Assistant Examiner* — Chuong A Ngo
(74) *Attorney, Agent, or Firm* — Marvin A. Motsenbocker; Mots Law, PLLC

(57) ABSTRACT

In a mobile communication system according to the present invention, a data transmitting-side apparatus is configured to retransmit a transmission data block according to a transmission acknowledgement signal transmitted from a data receiving-side apparatus. The data receiving-side apparatus includes: a maximum number-of-retransmissions manager unit configured to manage the maximum number of retransmissions of the transmission data block; and a transmission acknowledgement signal transmitter unit configured not to transmit the transmission acknowledgement signal, when the number of retransmissions of the transmission data block reaches the maximum number of retransmissions.

9 Claims, 9 Drawing Sheets

U.S. PATENT DOCUMENTS

| | | | |
|---|---|---|---|
| 6,724,777 B1 | 4/2004 | Yamazaki et al. | |
| 2002/0089927 A1* | 7/2002 | Fischer et al. | 370/229 |
| 2002/0154612 A1 | 10/2002 | Massie et al. | |
| 2002/0172208 A1 | 11/2002 | Malkamaki | |
| 2003/0012222 A1 | 1/2003 | Rinchiuso | |
| 2003/0043764 A1 | 3/2003 | Kim et al. | |
| 2003/0147371 A1 | 8/2003 | Choi et al. | |
| 2004/0006734 A1* | 1/2004 | Shin et al. | 714/755 |
| 2004/0160925 A1 | 8/2004 | Heo et al. | |
| 2004/0228273 A1 | 11/2004 | Kurobe et al. | |
| 2005/0013247 A1* | 1/2005 | Sipola et al. | 370/230 |
| 2005/0013263 A1 | 1/2005 | Kim et al. | |
| 2005/0030964 A1* | 2/2005 | Tiedemann et al. | 370/431 |
| 2005/0117559 A1* | 6/2005 | Malladi et al. | 370/342 |
| 2005/0213536 A1 | 9/2005 | Virtanen et al. | |
| 2007/0079207 A1 | 4/2007 | Seidel et al. | |

FOREIGN PATENT DOCUMENTS

| | | |
|---|---|---|
| EP | 1 241 901 A1 | 9/2002 |
| EP | 1361689 A1 | 11/2003 |
| JP | 07-336366 A | 12/1995 |
| JP | 11-004472 A | 1/1999 |
| JP | 11-122228 A | 4/1999 |
| JP | 11-177536 | 7/1999 |
| JP | 2004-153354 | 5/2004 |
| KR | 2004-0032943 A | 4/2004 |
| WO | 03/019838 A1 | 3/2003 |

OTHER PUBLICATIONS

Official Action Letter issued on Jul. 30, 2008 in the counterpart Korean Patent application.

The official action issued on Jul. 21, 2011, in the counterpart European patent application.

* cited by examiner

| TRANSMISSION FORMAT NUMBER | TRANSMISSION DATA BLOCK SIZE (BYTE) | TRANSMISSION POWER RATIO (dB) | MAXIMUM NUMBER OF RETRANSMISSIONS |
|---|---|---|---|
| 1 | 100 | 0 | 0 |
| 2 | 200 | 1 | 0 |
| 3 | 300 | 2 | 0 |
| 4 | 400 | 3 | 1 |
| 5 | 500 | 4 | 1 |
| 6 | 600 | 5 | 2 |
| 7 | 700 | 6 | 2 |
| 8 | 800 | 7 | 3 |
| 9 | 900 | 8 | 3 |
| 10 | 1000 | 9 | 4 |

MOBILE COMMUNICATION SYSTEM, RADIO BASE STATION, AND MOBILE STATION

TECHNICAL FIELD

The present invention relates to a mobile communication system in which a data transmitting-side apparatus is configured to retransmit a transmission data block according to a transmission acknowledgement signal transmitted from a data receiving-side apparatus, and a radio base station and mobile station that are used in such mobile communication system.

BACKGROUND ART

In a conventional mobile communication system, there is a problem of an increase of reception errors that results from large deterioration in the quality of uplink signals received by a radio base station and the quality of downlink signals received by a mobile station, because a received signal level in a data receiving-side apparatus instantaneously varies due to multi-path fading and the like.

As a technique for overcoming the aforementioned problem, there is known hybrid ARQ (Auto Repeat reQuest and hereinafter referred to as HARQ).

As illustrated in FIG. 1, in the HARQ, a data receiving-side apparatus (a radio base station Node B or a mobile station UE) transmits a transmission acknowledgement signal (Ack or Nack) to a data transmitting-side apparatus (a mobile station UE or a radio base station Node B), in response to a received transmission data block.

In general, only when receiving a transmission acknowledgement signal (Ack) indicating that a transmission data block (for example, a transmission data block #1) has been correctly received, the data transmitting-side apparatus is configured to transmit a next transmission data block (for example, a transmission data block #2).

On the other hand, when receiving a transmission acknowledgement signal (Nack) indicating that a transmission data block has not been correctly received, the data transmitting-side apparatus is configured to transmit the transmission data block again.

[Non-Patent Document 1] "W-CDMA Mobile Communication System", edited by Keiji Tachikawa, Maruzen Co., Ltd.

[Non-Patent Document 2] 3GPP TR25.896 v6.0.0

The HARQ is excellent in the point that a transmission data block can be transmitted to the data receiving-side apparatus without fail. However, it has a disadvantage that a transmission acknowledgement signal (Ack or Nack) is transmitted over a radio link in the opposite direction (a downlink is used when transmitting the transmission data block over an uplink, and the uplink is used when transmitting the transmission data block over the downlink), which results in an increase in load on the radio link in the opposite direction.

Moreover, in the mobile communication system, there is known a technique for controlling a transmission rate of a signal according to an availability of a radio link, a radio quality, and the like (technique for determining a transmission data block size).

For example, as a system to which the technique is to be applied, there are known "HSDPA (High Speed Downlink Packet Access) and "EUL (Enhanced Uplink)" that are being standardized by the 3GPP. Furthermore, in the system, the HARQ is to be applied.

In the system, the data receiving-side apparatus is configured to send a one-bit transmission acknowledgement signal indicating Ack or Nack, regardless of a transmission block data size.

In other words, when a transmission data block size is large, the load of a one-bit transmission acknowledgement signal indicating Ack or Nack is appropriate for its purpose, but when a transmission data block size is small, the load of the one-bit transmission acknowledgement signal indicating Ack or Nack is not an allowable condition.

Moreover, consider that the sums of transmission data block sizes in certain radio links are equal to each other. When each transmission data block size is large, only a small number of transmission data blocks are transmitted, so that only a small number of transmission acknowledgement signals are generated.

On the other hand, when each transmission data block size is small, a large number of transmission data blocks are transmitted, so that a large number of transmission acknowledgement signals are transmitted. This causes a problem that the radio load on the radio link in the opposite direction is increased.

Furthermore, as mentioned above, an influence on the mobile communication system caused by the load on the radio link in the opposite direction depends on the congestion degree of the radio link in the opposite direction.

Specifically, when the congestion degree of the radio link in the opposite direction is small, the influence on the mobile communication system caused by the load on the radio link in the opposite direction is small. However, when the congestion degree of the radio link in the opposite direction is large, there is a problem that the influence on the mobile communication system caused by the load on the radio link in the opposite direction becomes large.

DISCLOSURE OF THE INVENTION

Accordingly, the present invention has been made in consideration of the aforementioned problems and aims to provide a mobile communication system, a radio base station and a mobile station capable of improving a radio capacity when a retransmission control on a transmission data block is performed.

A first aspect of the present invention is summarized as a mobile communication system in which a data transmitting-side apparatus is configured to retransmit a transmission data block according to a transmission acknowledgement signal transmitted from a data receiving-side apparatus, wherein the data receiving-side apparatus includes: a maximum number-of-retransmissions manager unit configured to manage the maximum number of retransmissions of the transmission data block; and a transmission acknowledgement signal transmitter unit configured not to transmit the transmission acknowledgement signal, when the number of retransmissions of the transmission data block reaches the maximum number of retransmissions.

In the first aspect of the present invention, the transmission acknowledgement signal transmitter unit can be configured to transmit the transmission acknowledgement signal, when the number of retransmissions of the transmission data block reaches the maximum number of retransmissions, if a predetermined condition is satisfied.

In the first aspect of the present invention, the transmission acknowledgement signal transmitter unit can be configured never to transmit the transmission acknowledgement signal, when the maximum number of retransmissions is set to zero in the maximum number-of-retransmissions manager unit.

A second aspect of the present invention is summarized as a radio base station used in a mobile communication system in which a mobile station is configured to retransmit a transmission data block according to a transmission acknowledgement signal transmitted from the radio base station, the radio base station including: a maximum number-of-retransmissions manager unit configured to manage the maximum number of retransmissions of the transmission data block; and a transmission acknowledgement signal transmitter unit configured not to transmit the transmission acknowledgement signal, when the number of retransmissions of the transmission data block reaches the maximum number of retransmissions.

In the second aspect of the present invention, the transmission acknowledgement signal transmitter unit can be configured to transmit the transmission acknowledgement signal, when the number of retransmissions of the transmission data block reaches the maximum number of retransmissions, if a predetermined condition is satisfied.

In the second aspect of the present invention, the transmission acknowledgement signal transmitter unit can be configured never to transmit the transmission acknowledgement signal, when the maximum number of retransmissions is set to zero in the maximum number-of-retransmissions manager.

A third aspect of the present invention is summarized as a mobile station, which is used in a mobile communication system in which a radio base station is configured to retransmit a transmission data block according to a transmission acknowledgement signal transmitted from the mobile station, the mobile station including: a maximum number-of-retransmissions manager unit configured to manage the maximum number of retransmissions of the transmission data block; and a transmission acknowledgement signal transmitter unit configured not to transmit the transmission acknowledgement signal, when the number of retransmissions of the transmission data block reaches the maximum number of retransmissions.

In the third aspect of the present invention, the transmission acknowledgement signal transmitter unit can be configured to transmit the transmission acknowledgement signal, when the number of retransmissions of the transmission data block reaches the maximum number of retransmissions, if a predetermined condition is satisfied.

In the third aspect of the present invention, the transmission acknowledgement signal transmitter unit can be configured never to transmit the transmission acknowledgement signal, when the maximum number of retransmissions is set to zero in the maximum number-of-retransmissions manager.

BRIEF DESCRIPTIONS OF THE DRAWINGS

BEST MODE FOR CARRYING OUT THE INVENTION (Configuration of Mobile Communication System According to First Embodiment of the Present Invention)

Figure 1:
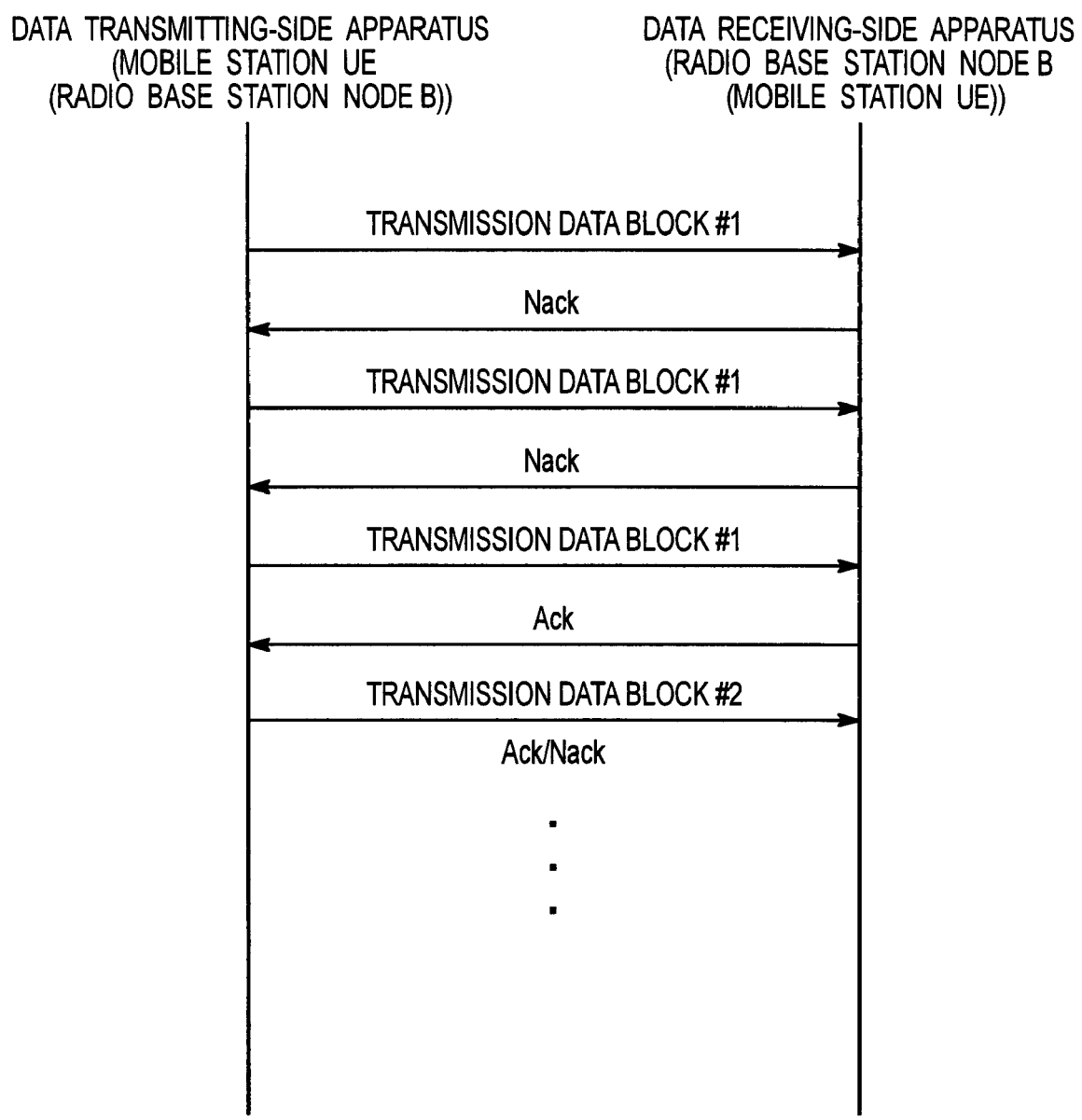
FIG. 1 is a sequence diagram showing an operation of a retransmission control processing in a conventional mobile communication system.
Figure 2:
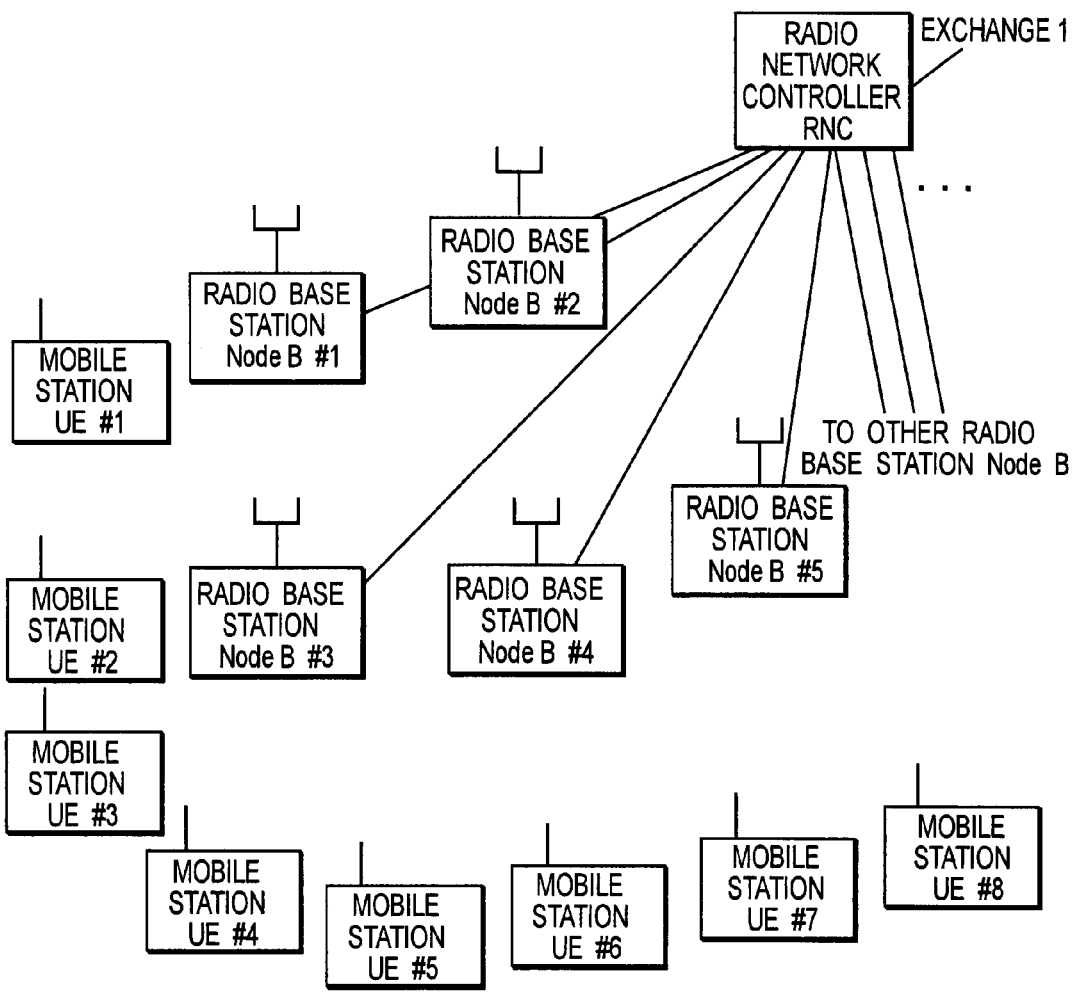
FIG. 2 is a general configuration view in a mobile communication system according to an embodiment of the present invention.

Descriptions will be given of the configuration of a mobile communication system according to an embodiment of the present invention, with reference to FIGS. 2 to 11. As illustrated in FIG. 2, the mobile communication system according to the first embodiment of the present invention includes a plurality of mobile stations UE #1 to #8, a plurality of radio base stations Node B #1 to #5, and a radio network controller RNC.

In the mobile communication system according to this embodiment, a data transmitting-side apparatus (a mobile station UE or radio base station Node B) is configured to retransmit a transmission data block according to a transmission acknowledgement signal (Ack or Nack) transmitted from a data receiving-side apparatus (a radio base station Node B or a mobile station UE).

The present invention can be applied to each of the mobile communication in an uplink (the mobile communication where the data transmitting-side apparatus is a mobile station UE, and the data receiving-side apparatus is a radio base station Node B), and the mobile communication in a downlink (the mobile communication where the data transmitting-side apparatus is a radio base station Node B, and the data receiving-side apparatus is a mobile station UE).

Note that even in the case where the present invention is applied to either mobile communication, since the data transmitting-side apparatus and the data receiving-side apparatus have the same configuration, descriptions will be given of the case where the present invention is applied to the mobile communication in the uplink in which the data transmitting-side apparatus is the mobile station UE, and in which the data receiving-side apparatus is the radio base station Node B, in this embodiment.

Moreover, in the mobile communication system according to this embodiment, the "HSDPA" is used in the downlink, and the "EUL (Enhanced Uplink)" is used in the uplink. It should be noted that the retransmission control using the HARQ is performed in both the "HSDPA" and the "EUL".

Accordingly, in the uplink, used are an enhanced dedicated physical channel (E-DPCH) having an enhanced dedicated physical data channel (E-DPDCH) and an enhanced dedicated physical control channel (E-DPCCH), and a dedicated physical channel (DPCH) having a dedicated physical data channel (DPDCH) and a dedicated physical control channel (DPCCH).

Here, the enhanced dedicated physical control channel (E-DPCCH) transmits control data for EUL such as a transmission format number for defining a transmission format of the E-DPDCH (transmission block size, etc.), information on HARQ (the number of retransmissions, etc.), and information on scheduling (transmission power and buffer residence-volume and the like in the mobile station UE).

Moreover, the enhanced dedicated physical data channel (E-DPDCH) is associated with the enhanced dedicated physical control channel (E-DPCCH), and transmits user data for the mobile station UE, according to the control data for EUL transmitted through the enhanced dedicated physical control channel (E-DPCCH).

The dedicated physical control channel (DPCCH) transmits control data such as a pilot symbol used in the RAKE combining, the SIR measurement, and the like, a TFCI (Transport Format Combination Indicator) for identifying the transmission format of an uplink dedicated physical data channel (DPDCH), and a transmission power control bit in a downlink and the like.

Furthermore, the dedicated physical data channel (DPDCH) is associated with the dedicated physical control channel (DPCCH), and transmits user data for the mobile station UE, according to the control data transmitted through the dedicated physical control channel (DPCCH). Note that in the case where user data that should be transmitted does not exist in the mobile station UE, the dedicated physical data channel (DPDCH) may be configured not to be transmitted.

Still furthermore, in the uplink, a high speed dedicated physical control channel (HS-DPCCH), which is required when the HSPDA is employed, and a random access channel (RACH) are also used.

The high speed dedicated physical control channel (HS-DPCCH) transmits a CPICH quality indicator (CQI) and a transmission acknowledgement signal (Ack or Nack) for the high speed dedicated physical data channel.

Note that descriptions in this embodiment will be given of the enhanced dedicated physical channel (E-DPCH), assuming that the present invention is applied to the E-DPCH configured to perform the retransmission control using the HARQ.

Figure 3:
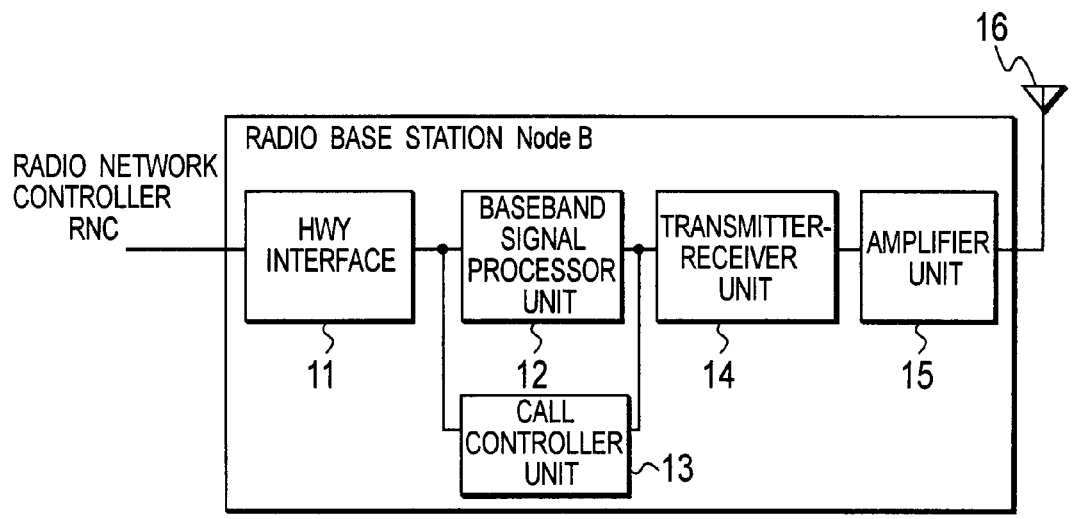
FIG. 3 is a functional block diagram of a radio base station of the mobile communication system according to an embodiment of the present invention.

As shown in FIG. 3, the radio base station Node B according to this embodiment includes a HWY interface 11, a baseband signal processor unit 12, a call controller unit 13, at least one transmitter-receiver unit 14, at least one amplifier unit 15, and at least one transmitter-receiver antenna 16.

The HWY interface 11 is an interface with a radio network controller RNC. More specifically, the HWY interface 11 is configured to receive, from the radio network controller RNC, user data to be transmitted to a mobile station UE via a downlink, and to input the user data to the baseband signal processor unit 13. Moreover, the HWY interface 11 is configured to receive control data for the radio base station Node B from the radio network controller RNC, and to input the control data to the call controller unit 13.

Furthermore, the HWY interface 11 is configured to acquire, from the baseband signal processor unit 12, user data included in uplink signals which are received from the mobile station UE via an uplink, and to transmit the user data to the radio network controller RNC. In addition, the HWY interface 11 is configured to acquire control data for the radio network controller RNC from the call controller unit 13, and to transmit the control data to the radio network controller RNC.

The baseband signal processor unit 12 is configured to generate baseband signals by performing the MAC layer processing and the layer-1 processing on the user data acquired from the HWY interface 11, and to forward the generated baseband signals to the transmitter-receiver unit 14.

Here, the MAC layer processing in the downlink includes a scheduling processing, a transmission rate control processing, and the like. Moreover, the layer-1 processing in the downlink includes a channel coding processing, and a spreading processing for user data, and the like.

Additionally, the baseband signal processor unit 12 is configured to extract user data by performing the MAC layer processing and the layer-1 processing on the baseband acquired from the transmitter-receiver unit 14, and to forward the extracted user data to the HWY interface 11.

Here, the MAC layer processing in the uplink includes the MAC control processing, a header disposal processing, and the like. Furthermore, the layer-1 processing in the downlink includes a despreading processing, the RAKE combining processing, an error correction decoding processing, and the like.

Note that specific functions of the baseband signal processor unit 12 will be described later. Furthermore, the call controller unit 13 is configured to perform a call control processing, according to the control data acquired from the HWY interface 11.

The transmitter-receiver unit 14 is configured to perform processing for converting the baseband signals, which are acquired from the baseband signal processor unit 12, into the radio frequency band signals (downlink signals), and to transmit the radio frequency signals to the amplifier unit 15. Moreover, the transmitter-receiver unit 14 is configured to perform processing for converting the radio frequency band signals (uplink signals), which are acquired from the amplifier unit 15, into the baseband signals, and to transmit the baseband signals to the baseband signal processor unit 12.

The amplifier unit 15 is configured to amplify the downlink signals acquired from the transmitter-receiver unit 14, and to transmit the amplified downlink signals to the mobile station UE via the transmitter-receiver antenna 16.

Furthermore, the amplifier unit 15 is configured to amplify the uplink signals received by the transmitter-receiver antenna 16, and to transmit the amplified uplink signals to the transmitter-receiver unit 14.

Figure 4:
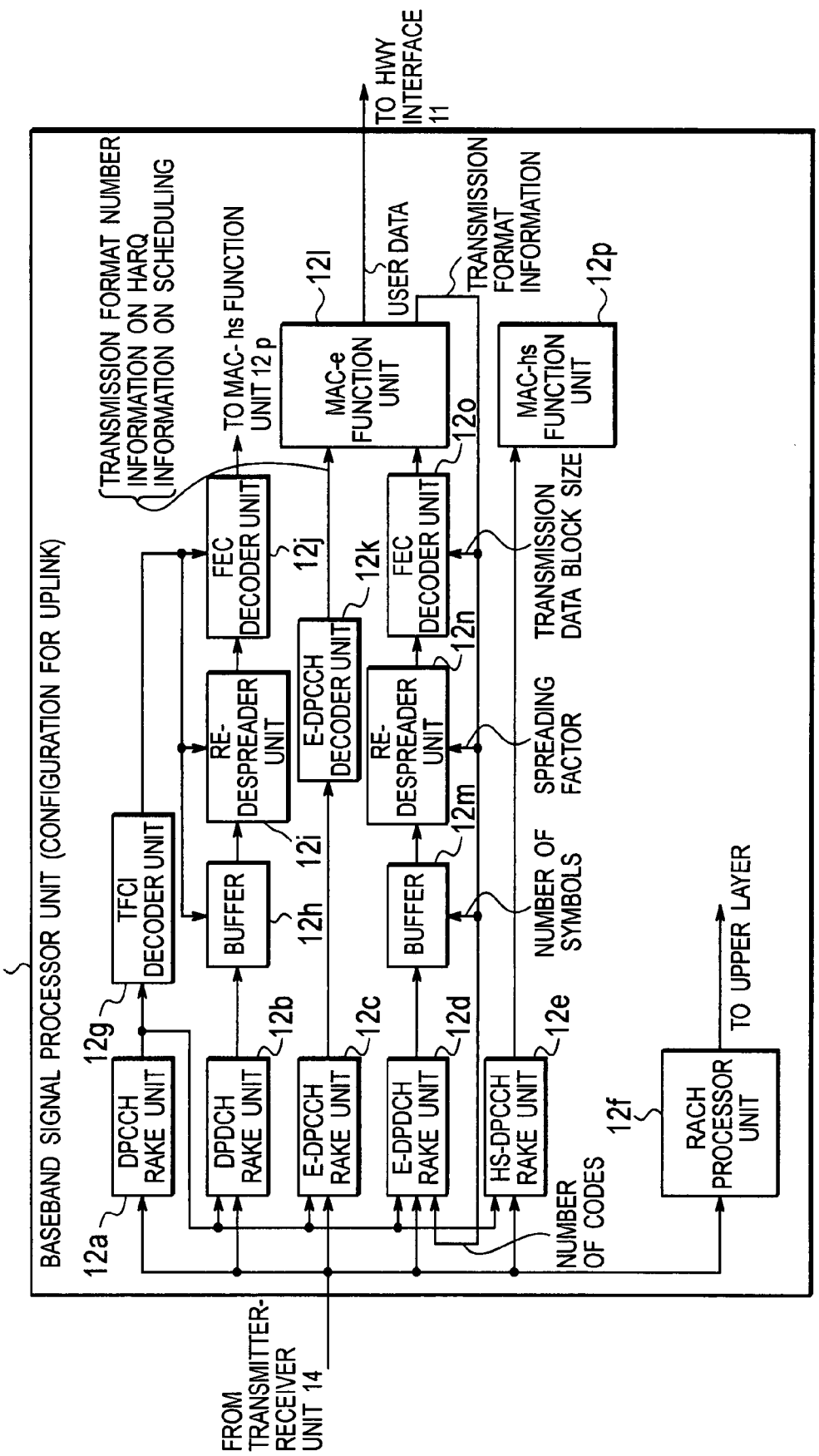
FIG. 4 is a functional block diagram of a baseband signal processor unit (configuration for the uplink) of the radio base station of the mobile communication system according to an embodiment of the present invention.

As shown in FIG. 4, the baseband signal processor unit 12 includes, as a uplink configuration 12#1, a DPCCH RAKE unit 12a, a DPDCH RAKE unit 12b, an E-DPCCH RAKE unit 12c, an E-DPDCH RAKE unit 12d, an HS-DPCCH RAKE unit 12e, a RACH processor unit 12f, a TFCI decoder unit 12g, buffers 12h and 12m, re-despreader units 12i, 12n, FEC decoder units 12j and 12o, an E-DPCCH decoder unit 12k, a MAC-e function unit 12l, and a MAC-hs function unit 12p.

The E-DPCCH RAKE unit 12c is configured to perform, on the enhanced dedicated physical control channel (E-DPCCH) in the baseband signals transmitted from the transmitter-receiver unit 14, the despreading processing, and the RAKE combining processing using a pilot symbol included in the dedicated physical control channel (DPCCH).

The E-DPCCH decoder unit 12k is configured to acquire a transmission format number, information on HARQ, information on scheduling, and the like, by performing the decoding processing on the RAKE combining outputs of the E-DPCCH RAKE unit 12c, and to input the information to the MAC-e function unit 12l.

The E-DPDCH RAKE unit 12d is configured to perform, on the enhanced dedicated physical data channel (E-DPDCH) in the baseband signals transmitted from the transmitter-receiver unit 14, the despreading processing using the number of codes transmitted from the MAC-e function unit 12l, and the RAKE combining processing using the pilot symbol included in the dedicated physical control channel (DPCCH).

The buffer 12m is configured to store the RAKE combining outputs of the E-DPDCH RAKE unit 12d, according to the number of symbols transmitted from the MAC-e function unit 12l.

The re-despreader unit 12n is configured to perform the despreading processing on the RAKE combining outputs of the E-DPDCH RAKE unit 12d stored in the buffer 12m, according to a spreading ratio transmitted from the MAC-e function unit 12l.

The FEC decoder unit 12o is configured to perform the error correction decoding processing (an FEC decoding processing) on the outputs of the re-despreader unit 12n, according to the transmission data block size transmitted from the MAC-e function unit 12l.

The MAC-e function unit 12l is configured to calculate and output transmission format information (the number of codes, the number of symbols, a spreading ratio, a transmission data block size, and the like), according to the transmission format number, the information on HARQ, the information on scheduling, and the like, which are acquired from the E-DPCCH decoder unit 12k.

Figure 5:
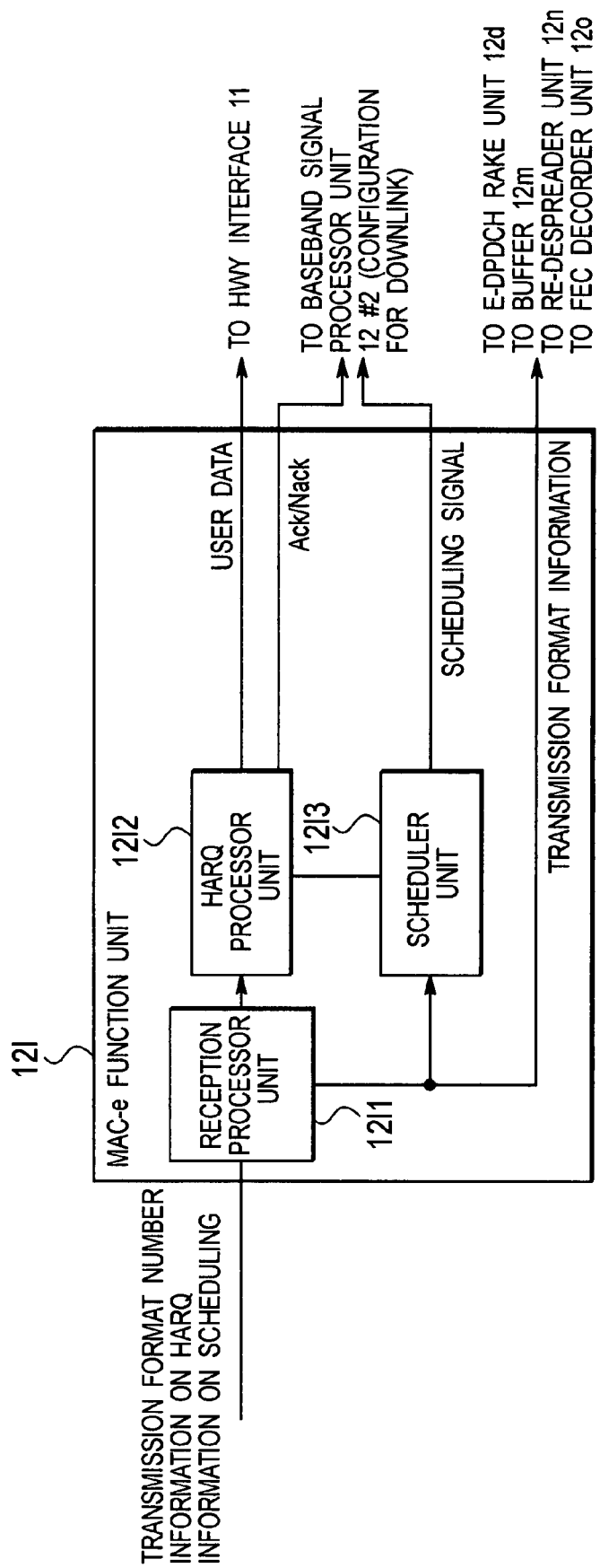
FIG. 5 is a functional block diagram of a MAC-e function unit of the baseband signal processor unit (configuration for the uplink) of the radio base station of the mobile communication system according to an embodiment of the present invention.

Additionally, as shown in FIG. 5, the MAC-e function unit 12l includes a reception processor unit 12l1, a HARQ processor unit 12l2, and a scheduler unit 12l3.

Figures 6, 7:
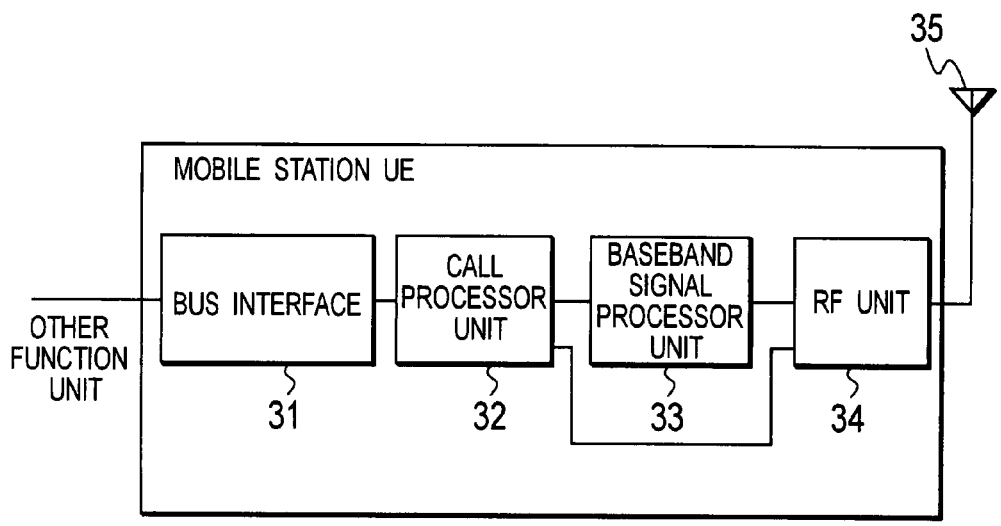
FIG. 6 is a view illustrating an example of a transmission format table managed by the MAC-e function unit of the baseband signal processor unit (configuration for the uplink) of the radio base station of the mobile communication system according to an embodiment of the present invention.
FIG. 7 is a functional block diagram of a mobile station of the mobile communication system according to an embodiment of the present invention.

As shown in FIG. 6, the reception processor unit 12l1 manages a transmission format table that associates the transmission format number, the transmission data block size, a transmission power ratio and the maximum number of retransmissions with one another.

Here, the transmission power ratio is assumed to be calculated by "transmission power of the enhanced dedicated physical data channel (E-DPDCH)/transmission power of the enhanced dedicated physical data channel (E-DPCCH)".

Note that the transmission format table may be configured to associate the other transmission format information such as the number of codes, the number of symbols, the spreading factor and the like, with the transmission format number.

Moreover, as shown in FIG. 6, in the transmission format table, when the transmission data block size is small, the maximum number of retransmissions is set to zero, and when the transmission data block size becomes large, the maximum number of retransmissions is set to be increased.

The aforementioned setting permits the load of the transmission acknowledgement signal for the large-sized transmission data block. On the other hand, the setting reduces the load of the transmission acknowledgement signal for the small-sized transmission data block, and thereby making it possible to optimize the radio capacity of the uplink and the downlink.

The reception processor unit 12l1 is configured to transmit, to the HARQ processor unit 12l2, information on HARQ inputted from the E-DPCCH decoder unit 12o and user data inputted from the FEC decoder unit 12k.

Moreover, the reception processor unit 12l1 is configured to transmit, to the HARQ processor unit 12l2, the maximum number of retransmissions corresponding to the transmission format number inputted from the E-DPCCH decoder unit 12o, with reference to the transmission format table.

Furthermore, the reception processor unit 12l1 is configured to transmit, to the scheduler unit 12l3, information on scheduling inputted from the E-DPCCH decoder unit 12o.

Additionally, the reception processor unit 12l1 is configured to output transmission format information corresponding to the transmission format number inputted from the E-DPCCH decoder unit 12o, with reference to the transmission format table.

The HARQ processor unit 12l2 determines whether or not reception processing of user data has been successful by performing the CRC error detection processing on the received user data. Then, the HARQ processor unit 12l2 generates a transmission acknowledgement signal (Ack or Nack), and transmits the transmission acknowledgement signal to a baseband signal processor unit (configuration for the downlink) 12#2, based on the determination result. Furthermore, when the aforementioned determination result is OK, the HARQ processor unit 12l2 transmits the user data to the radio network controller RNC.

In addition, when the number of retransmissions of a specific transmission data block reaches the maximum number of retransmissions, the HARQ processor unit 12l2 is configured not to transmit the transmission acknowledgement signal for the reception result of the transmission data block.

Moreover, whenever the maximum number of retransmissions, which corresponds to the transmission format number of the specific transmission data block, is set to zero in the transmission format table, the HARQ processor unit 12l2 is configured not to transmit the transmission acknowledgement signal for the reception result of the relevant transmission data block.

The scheduler unit 12l3 decides whether or not transmission can be performed at each mobile station UE, a transmission rate (a transmission data block size) at each mobile station, the maximum allowable transmission power (the maximum allowable transmission power of E-DPCCH and E-DPDCH) at each mobile station UE, and the like, according to the received information on scheduling and the like, and then transmits the determined results to the baseband signal processor unit (configuration for the downlink) 12#2.

Note that the scheduler unit 12l3 may be configured to decide the transmission data block size according to the congestion degree of the uplink, the radio quality, and the like. Moreover, the scheduler unit 12l3 may be configured to set an upper limit for the maximum allowable transmission power, according to the capability of the maximum transmission power of the mobile station.

As shown in FIG. 7, the mobile station UE according to this embodiment includes a path interface 31, a call processor unit 32, a baseband processor unit 33, a RF unit 34, and a transmitter-receiver antenna 36.

However, such functions may exist independently as hardware, and may be partly or entirely integrated, or may be configured through a process of software.

The bus interface 31 is configured to forward the user data outputted from the call processor unit 32 to another function unit (for example, an application related function unit). Furthermore, the bus interface 31 is configured to forward the user data transmitted from another function unit (for example, the application related function unit) to the call processor unit 32.

The call processor unit 32 is configured to perform the call control processing for transmitting and receiving the user data.

The baseband signal processor unit 33 is configured to transmit, to the call processor unit 32, the user data acquired in a way that the baseband signals transmitted from the RF unit 34 is subjected to: the layer-1 processing including the despreading processing, the RAKE combining processing, and the FEC decoding processing; the MAC processing including the MAC-e processing and the MAC-d processing; and the RLC processing.

Moreover, the baseband signal processor unit 33 is configured to generate baseband signals by performing the RLC processing, the MAC processing, or the layer-1 processing on the user data transmitted from the call processor unit 32, and to transmit the baseband signals to the RF unit 34.

Note that the detailed functions of the baseband signal processor unit 33 will be described later. The RF unit 34 is configured to generate baseband signals by performing a detection processing, a filtering processing, a quantization processing, and the like, on radio frequency signals received through the transmitter-receiver antenna 35, and to transmit the baseband signals to the baseband signal processor unit 33. Furthermore, the RF unit 34 is configured to convert the baseband signals transmitted from the baseband signal processor unit 33 into the radio frequency signals.

Figure 8:
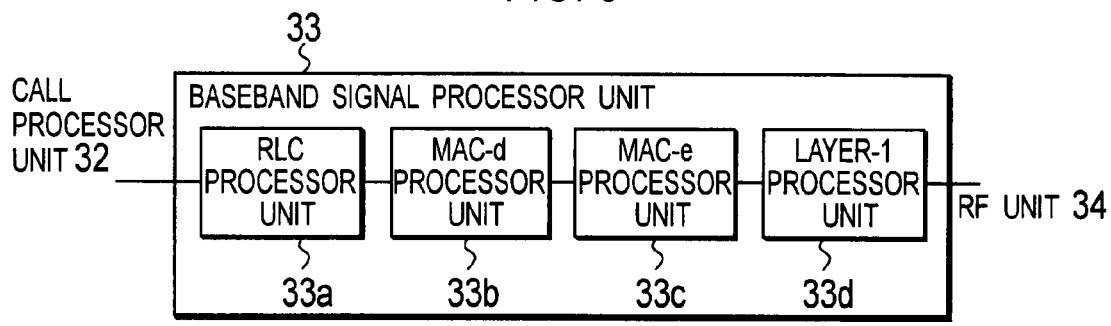
FIG. 8 is a functional block diagram of a baseband signal processor unit of the mobile station of the mobile communication system according to an embodiment of the present invention.

As shown in FIG. 8, the baseband signal processor unit 33 includes a RLC processor unit 33*a*, a MAC-d processor unit 33*b*, a MAC-e processor unit 33*c*, and a layer-1 processor unit 33*d*.

The RLC processor unit 33*a* is configured to perform a processing in an upper layer of a layer-2 on the user data transmitted from the call processor unit 32, and to transmit the processed user data to the MAC-d processor unit 33*b*.

The MAC-d processor unit 33*b* is configured to attach a channel identifier header, and to create a transmission format in the uplink according to the limitation of transmission power in the uplink.

Figure 9:
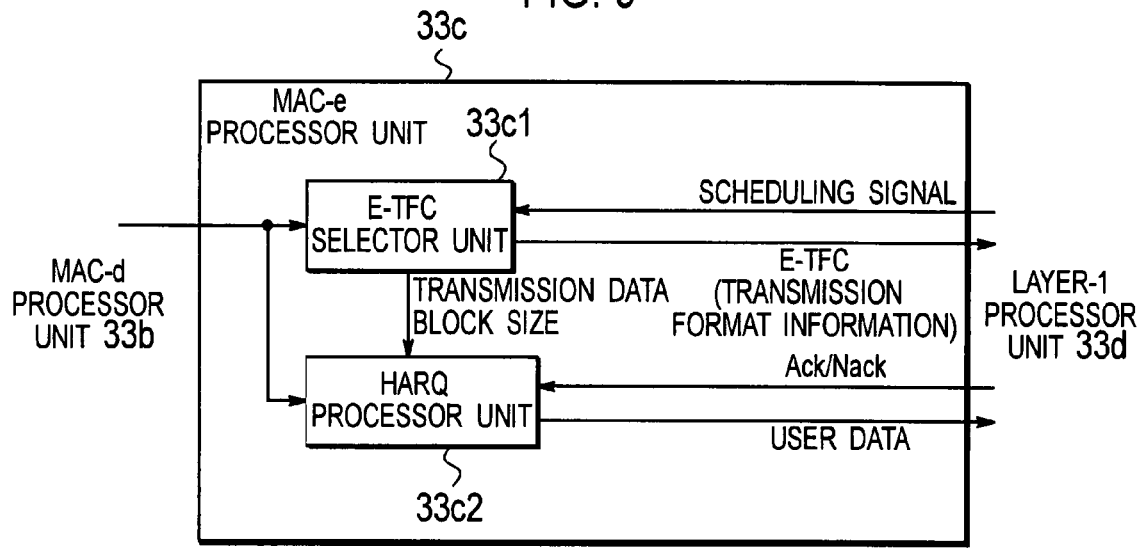
FIG. 9 is a functional block diagram of a MAC-e processor unit of the baseband signal processor unit of the mobile station of the mobile communication system according to an embodiment of the present invention.

As shown in FIG. 9, the MAC-e processor unit 33*c* includes an E-TFC selector unit 33*c*1 and a HARQ processor unit 33*c*2.

The E-TFC selector unit 33*c*1 is configured to determine retransmission formats of the enhanced dedicated physical data channel (E-DPDCH) and the enhanced dedicated physical control channel (E-DPCCH), according to the scheduling signals transmitted from the radio base station Node B.

Furthermore, the E-TFC selector unit 33*c*1 is configured to transmit an E-TFC (transmission format information) indicating the determined retransmission format to the layer-1 processor unit 33*d*, and also to transmit a determined transmission data block size (or a transmission power ratio between the enhanced dedicated physical data channel (E-DPDCH) and the enhanced dedicated physical control channel (E-DPCCH)) to the HARQ processor unit 33*c*2.

Here, the scheduling signals may be those designating the transmission data block size, or those designating the transmission power ratio of the enhanced dedicated physical data channel (E-DPDCH) to the enhanced dedicated physical control channel (E-DPCCH), or may be those simply indicating UP/DOWN.

The HARQ processor unit 33*c*2 is configured to perform the N Process Stop and Wait, and to transmit the user data according to a transmission acknowledgement signal received from the radio base station Node B.

Moreover, the HARQ processor unit 33*c*2 stores the transmission format table as shown in FIG. 6. When Nack is received and when the number of retransmissions of a specific transmission data block (user data) is below the maximum number of retransmissions corresponding to its transmission data block size (or transmission power ratio), the HARQ processor unit 33*c*2 performs retransmission of the transmission data block. When Ack is received or when the number of retransmissions of the specific transmission data block reaches the maximum number of retransmissions corresponding to its transmission data block size (or transmission power ratio), the HARQ processor unit 33*c*2 transmits a next transmission data block.

Figure 10:
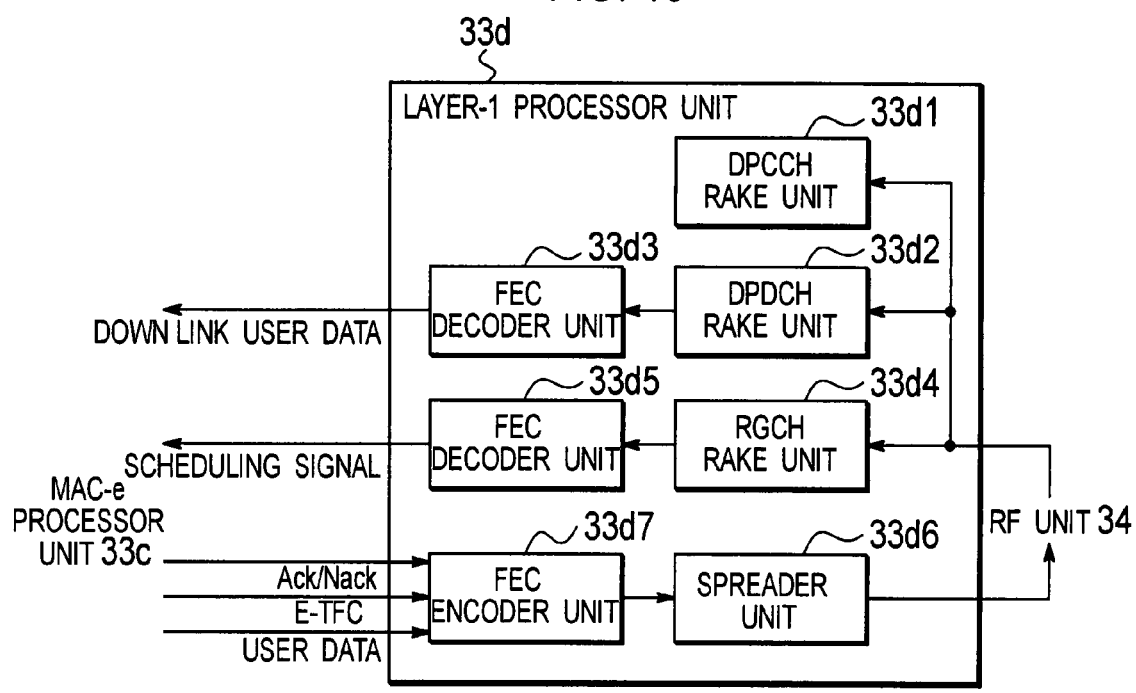
FIG. 10 is a functional block diagram of a layer 1 processor unit of the base band signal processor unit of the mobile station of the mobile communication system according to an embodiment of the present invention.

As shown in FIG. 10, the layer-1 processor unit 33*d* includes a DPCCH RAKE unit 33*d*1, a DPDCH RAKE unit 33*d*2, a RGCH RAKE unit 33*d*4, a spreader unit 33*d*6, an FEC encoder unit 337*d*, and FEC decoder units 33*d*3 and 33*d*5.

The DPDCH RAKE unit 33*d*2 is configured to perform the despreading processing and the RAKE combining processing on the dedicated physical data channel DPDCH in the downlink signals transmitted from the RF unit 34, and to output the processed DPDCH to the FEC decoder unit 33*d*3.

The FEC decoder unit 33*d*3 is configured to perform the FEC decoding processing on the RAKE combining outputs of the DPDCH RAKE unit 33*d*2, and to extract user data so as to be transmitted to the MAC-e processor unit 33*c*.

The RGCH RAKE unit 33*d*4 is configured to perform the despreading processing and the RAKE combining processing on a relative grant channel (RGCH) in the downlink signals transmitted from the RF unit 34, and to output the processed RGCH to the FEC decoder unit 33*d*5.

The FEC decoder unit 33*d*5 is configured to perform the FEC decoding processing on the RAKE combining outputs of the RGCH RAKE unit 33*d*4, and to extract scheduling signals so as to be transmitted to the MAC-e processor unit 33*c*. Note that the scheduling signals include an allowable transmission rate in the uplink (or the transmission power ratio of the enhanced dedicated physical data channel (E-DPDCH) to the enhanced dedicated physical control channel (E-DPCCH)) and the like.

The FEC encoder unit 33*d*7 is configured to perform the FEC encoding processing on the user data transmitted from the MAC-e processor unit 33*c*, by using the transmission format information transmitted from the MAC-e processor unit 33*c*, in accordance to the transmission acknowledgement signal transmitted from the MAC-e processor unit 33*c*, and to transmit the processed user data to the spreader unit 33*d*6.

The spreader unit 33*d*6 is configured to perform the spreading processing on the user data transmitted form the FEC encoder unit 33*d*7, and to transmit the processed user data to the RF unit 34.

The radio network controller RNC according to this embodiment is an apparatus located in an upper level of the radio base station Node B, and is configured to control radio communications between the radio base station Node B and the mobile station UE.

Figure 11:
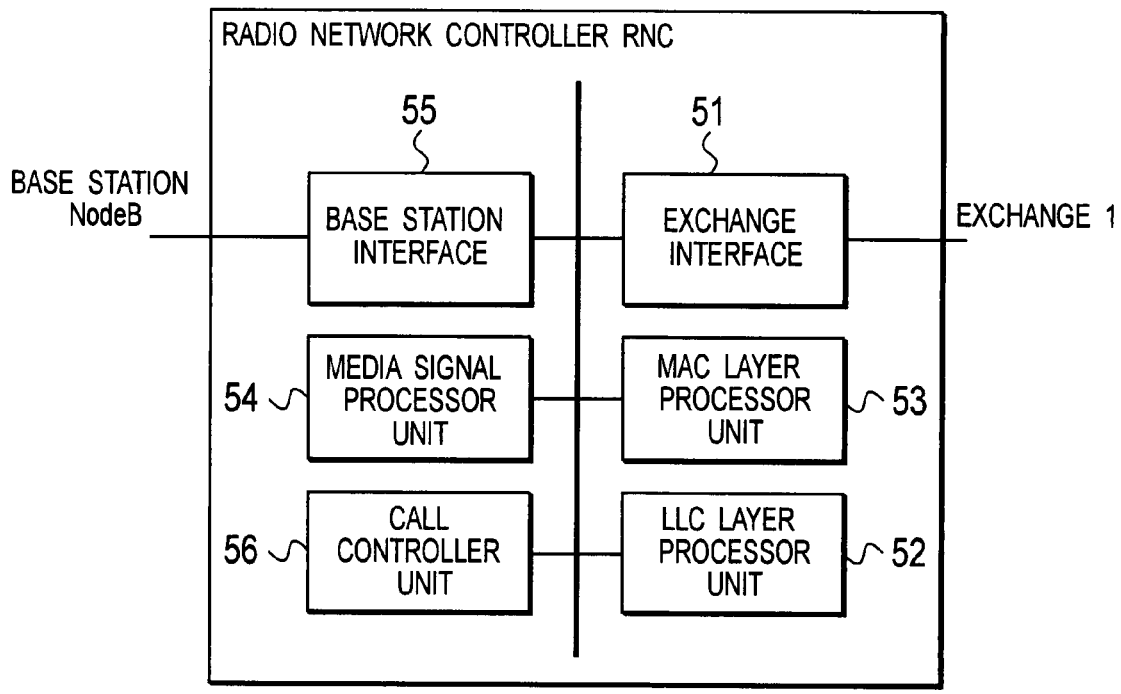
FIG. 11 is a functional block diagram of a radio network controller of the mobile communication system according to an embodiment of the present invention.

As shown in FIG. 11, the radio network controller RNC according to this embodiment includes an exchange interface 51, an LLC layer processor unit 52, a MAC layer processor unit 53, a media signal processor unit 54, a base station interface 55, and a call controller unit 56.

The exchange interface 51 is an interface with an exchange 1. The exchange interface 51 is configured to forward the downlink signals transmitted from the exchange 1 to the LLC layer processor unit 52, and to forward the uplink signals transmitted from the LLC layer processor unit 52 to the exchange 1.

The LLC layer processor unit 52 is configured to perform a LLC (Logical Link Control) sub-layer processing such as a combining processing of a header such as a sequence number or a trailer. The LLC layer processor unit 52 is configured to transmit the uplink signals to the exchange interface 51, and to transmit the downlink signals to the MAC layer processor unit 53, after the LLC sub-layer processing is performed.

The MAC layer processor unit 53 is configured to perform the MAC layer processing such as a priority control processing, a header attachment processing and the like. The MAC layer processor unit 53 is configured to transmit the uplink signals to the LLC layer processor unit 52, and to transmit the downlink signals to the radio base station interface 55 (or the media signal processor unit 54), after the MAC layer processing is performed.

The media signal processor unit 54 is configured to perform a media signal processing on voice signals or real time image signals. The media signal processor unit 54 is configured to transmit the uplink signals to the MAC layer processor unit 53, and to transmit the downlink signals to the radio base station interface 55, after the media signal processing is performed.

The base station interface 55 is an interface with the radio base station Node B. The base station interface 55 is configured to forward the uplink signals transmitted from the radio base station Node B to the MAC layer processor unit 53 (or to the media signal processor unit 54), and to forward the downlink signals transmitted from the MAC layer processor unit 53 (or from the media signal processor unit 54) to the radio base station Node B.

The call controller unit 56 is configured to perform a call reception control processing, a channel setup and release processing by layer-3 signaling, and the like.

Moreover, the call controller unit 56 is configured to transmit, to the mobile station UE and the radio base station Node B, information for generating the transmission format table as shown in FIG. 6.

(Operations of Mobile Communication System According to the First Embodiment of the Present Invention)

Figure 12:
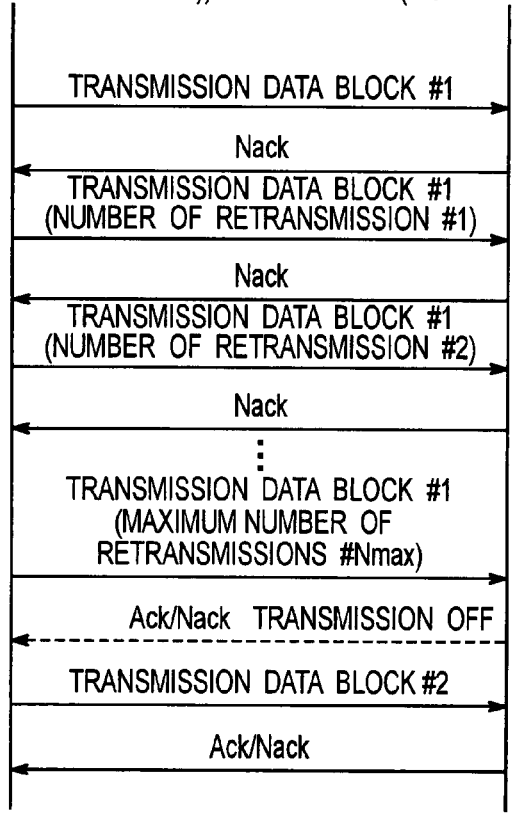
FIG. 12 is a sequence diagram illustrating an operation of the mobile communication system according to an embodiment of the present invention.
Figure 13:
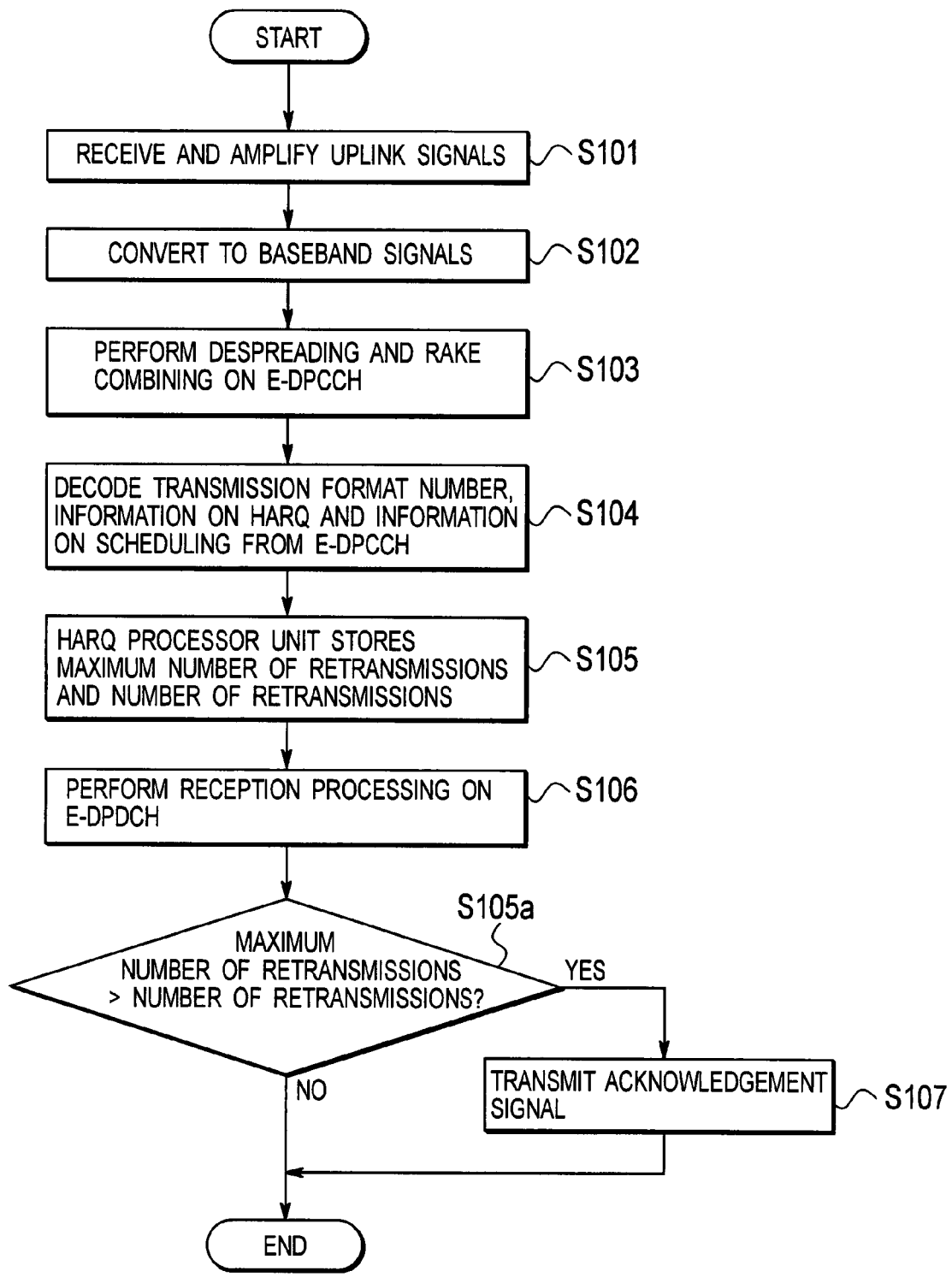
FIG. 13 is a flowchart illustrating an operation of a data receiving-side apparatus that has received a transmission data block in the mobile communication system according to an embodiment of the present invention.

With reference to FIGS. 12 and 13, an explanation will be given of operations in which the data transmitting-side apparatus transmits the transmission data block to the data receiving-side apparatus in the mobile communication system according to the first embodiment of the present invention.

As shown in FIG. 12, the data transmitting-side apparatus retransmits a transmission data block #1 until the number of retransmissions reaches the maximum number of retransmissions #Nmax. Note that when the number of retransmissions of transmission data block #1 reaches the maximum number of retransmissions #Nmax, the data receiving-side apparatus does not transmit the transmission acknowledgement signal (Ack/Nack).

Here, with reference to FIG. 13, an explanation will be given of the operations of the data receiving-side apparatus when receiving the transmission data block #1.

As shown in FIG. 13, in step S101, the radio base station Node B receives the uplink signals including the transmission data block #1 transmitted from the mobile station UE through the transmitter-receiver antenna 16, and the amplifier unit 15 of the base station Node B amplifies reception power of the received uplink signals.

In step S102, the transmitter-receiver unit 14 of the radio base station Node B converts the received uplink signals in the radio band into baseband signals.

In step S103, the E-DPCCH RAKE unit 12c in the baseband signal processor unit (configuration for the uplink) 12#1 of the radio base station Node B performs the despreading processing and the RAKE combining processing on the enhanced dedicated physical control channel E-DPCCH in the received baseband signals.

In step S104, the E-DPCCH decoder unit 12k in the baseband signal processor unit (configuration for the uplink) of the radio base station Node B performs the decoding processing on the enhanced dedicated physical control channel E-DPCCH, and thereby extracts the transmission format number, the information on HARQ and the information on scheduling.

In step S105, the reception processor 12/1, which includes a MAC-e function unit 12l in the baseband signal processor unit (configuration for the uplink) 12#1 of the radio base station Node B, acquires the maximum number of retransmissions corresponding to the transmission format number transmitted from the E-DPCCH decoder unit 12k with reference to the transmission format table, transmits the maximum number of retransmissions to the HARQ processor unit 12/2, and forwards, to the HARQ processor unit 12/2, the information on HARQ transmitted from the E-DPCCH decoder unit 12k.

Then, the HARQ processor unit 12/2 stores the received maximum number of retransmissions and the number of retransmissions of the transmission data block #1 included in the received information on HARQ to be associated with each other.

In step S106, the E-DPDCH RAKE unit 12d, the buffer 12m, the re-despreader unit 12n, and the FEC decoder unit 12o in the baseband signal processor unit (configuration for the uplink) 12#1 of the radio base station Node B perform the reception processing of the enhanced dedicated physical data channel E-DPDCH based on the transmission format information transmitted from the MAC-e function unit 12l.

In step S105a, the HARQ processor unit 12/2 determines whether or not the number of retransmissions of the transmission data block #1 reaches the maximum number of retransmissions.

When determining that the number of retransmissions of the transmission data block #1 does not reach the maximum number of retransmissions, the HARQ processor unit 12/2 generates a transmission acknowledgement signal in response to the result of the CRC error detection performed on the enhanced dedicated physical data channel EDPDCH, and the baseband signal processor unit (configuration for the downlink) 12#2 transmits the transmission acknowledgement signal to the mobile station UE.

When determining that the number of retransmissions of the transmission data block #1 reaches the maximum number of retransmissions, the HARQ processor unit 12/2 ends the present operation without generating the transmission acknowledgement signal.

(Advantageous Effects of the Mobile Communication System According to the First Embodiment of the Present Invention)

According to the mobile communication system according to the first embodiment of the present invention, it is possible to improve radio capacity when the retransmission control of the transmission data block is performed.

Alternative Embodiment 1

In alternative embodiment 1 of the present invention, the HARQ processor unit 12/2 is configured to transmit the transmission acknowledgement signal, when a predetermined condition is satisfied even if the number of retransmissions of the transmission data block reaches the maximum number of retransmissions.

In other words, it is necessary for the HARQ processor unit 12/2 to determine whether or not the predetermined condition is satisfied, when the number of retransmissions of the transmission data block reaches the maximum number of retransmissions.

Figure 14:
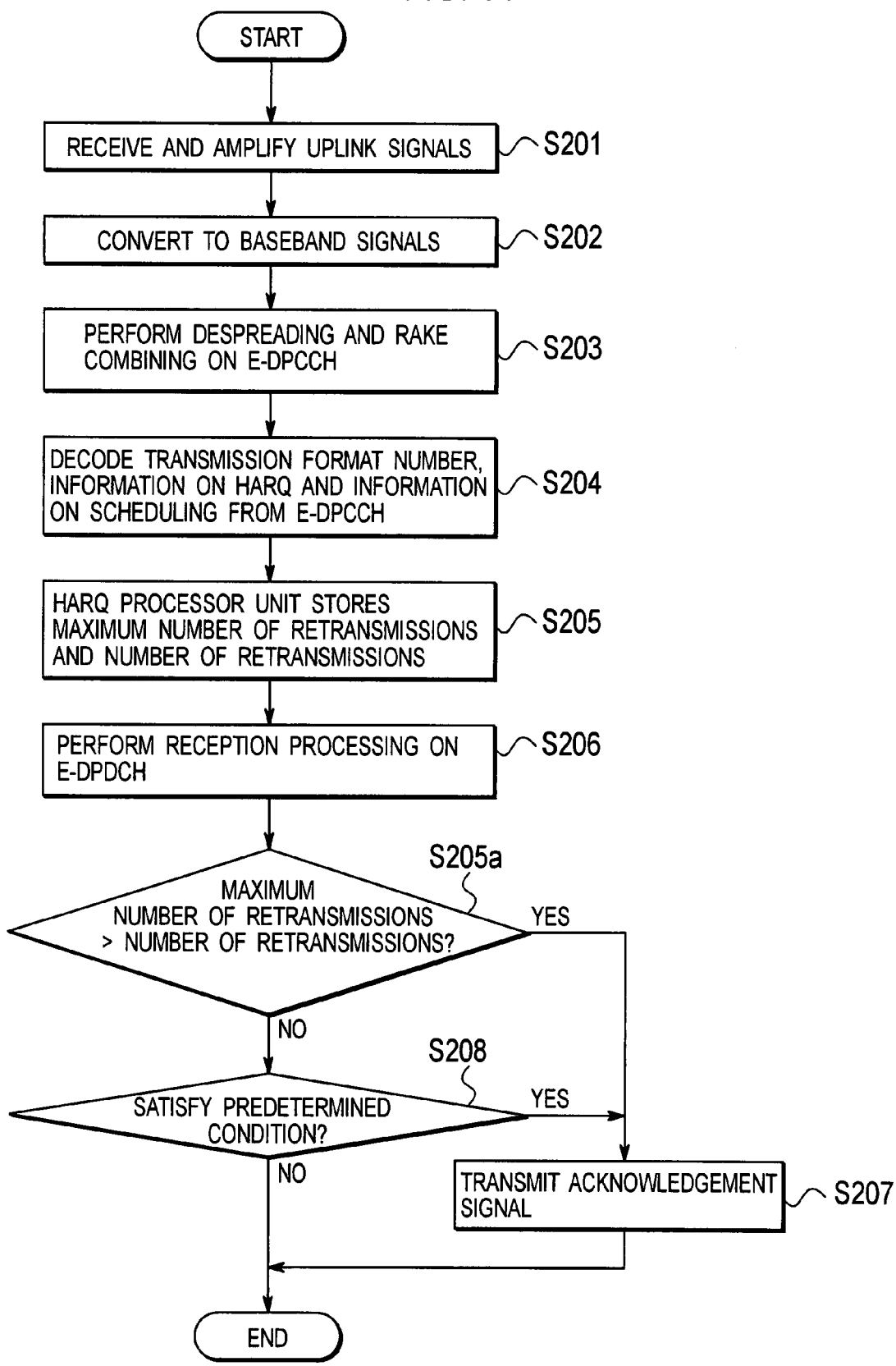
FIG. 14 is a flowchart illustrating an operation of a data receiving-side apparatus that has received a transmission data block in the mobile communication system according to an alternative embodiment of the present invention.

FIG. 14 shows the operations of the data receiving-side apparatus (radio base station Node B) according to the alternative embodiment 1. The present operations are the same as those of the data receiving-side apparatus (radio base station Node B) in the first embodiment shown in FIG. 13, except for the addition of step 208.

The following will explain an example of determining whether or not the predetermined condition is satisfied in step S208.

For example, it can be determined that the predetermined condition is satisfied in the case where the data transmitting-side apparatus (mobile station UE) is configured to control the transmission rate of the uplink user data by a predetermined method according to the transmission acknowledgement signal transmitted from the data receiving-side apparatus (radio base station Node B).

In other words, it is determined that the predetermined condition is satisfied in the case where the data transmitting-side apparatus (mobile station UE) is configured to change the transmission rate of the uplink user data according to the relative grant channel (RGCH) and an absolute grant channel (AGCH) transmitted from the data receiving-side apparatus (radio base station Node B), only when the transmission acknowledgement signal (ACK/NACK) transmitted from the data receiving-side apparatus (radio base station Node B) is received.

Here, the relative grant channel (RGCH) is that for notifying information which instructs increase and decrease in the transmission rate of the uplink user data (relative rate), and the absolute grant channel (AGCH) is that for notifying information which instructs the transmission rate itself of the uplink user data (absolute rate).

In this case, since the data transmitting-side apparatus (mobile station UE) needs the transmission acknowledgement signal (ACK/NACK) when controlling the transmission rate of the uplink user data, the data receiving-side apparatus (radio base station Node B) is configured to transmit the transmission acknowledgement signal (ACK/NACK) even when the number of retransmissions of the transmission data block reaches the maximum number of retransmissions.

Moreover, when the transmission data block relates to non-real time communications, and when the retransmission control is not performed on the upper layer, it can be determined that the predetermined condition is satisfied.

In this case, even when the number of retransmissions of the transmission data block reaches the maximum number of retransmissions, the data receiving-side apparatus (radio base station Node B) is configured to transmit the transmission acknowledgement signal (ACK/NACK) in order to prevent the missing in the transmission data block in the data receiving-side apparatus (radio base station Node B).

INDUSTRIAL APPLICABILITY

As described above, according to the present invention, it is possible to provide a mobile communication system, a radio base station and a mobile station capable of improving a radio capacity when a retransmission control on a transmission data block is performed.

The invention claimed is:

1. A mobile communication system in which a data transmitting-side apparatus is configured to retransmit a transmission data block according to a transmission acknowledgement signal transmitted from a data receiving-side apparatus, wherein
the data receiving-side apparatus comprises:
a maximum number-of-retransmissions manager unit configured to manage the maximum number of retransmissions of the transmission data block; and
a transmission acknowledgement signal transmitter unit configured to transmit the transmission acknowledgement signal based on a reception result of the transmission data block, before the number of retransmissions of the transmission data block reaches the maximum number of retransmissions, wherein
the transmission acknowledgement signal transmitter unit omits to transmit the transmission acknowledgement signal, when the number of retransmissions of the transmission data block reaches the maximum number of retransmissions.

2. The mobile communication system according to claim 1, wherein the transmission acknowledgement signal transmitter unit is configured to transmit the transmission acknowledgement signal, when the number of retransmissions of the transmission data block reaches the maximum number of retransmissions, if a predetermined condition is satisfied.

3. The mobile communication system according to claim 1, wherein the transmission acknowledgement signal transmitter unit is configured never to transmit the transmission acknowledgement signal, when the maximum number of retransmissions is set to zero in the maximum number-of-retransmissions manager unit.

4. A radio base station used in a mobile communication system in which a mobile station is configured to retransmit a transmission data block according to a transmission acknowledgement signal transmitted from the radio base station, the radio base station comprising:
a maximum number-of-retransmissions manager unit configured to manage the maximum number of retransmissions of the transmission data block; and
a transmission acknowledgement signal transmitter unit configured to transmit the transmission acknowledgement signal based on a reception result of the transmission data block, before the number of retransmissions of the transmission data block reaches the maximum number of retransmissions,
wherein the transmission acknowledgement signal transmitter unit omits to transmit the transmission acknowledgement signal, when the number of retransmissions of the transmission data block reaches the maximum number of retransmissions.

5. The radio base station according to claim 4, wherein the transmission acknowledgement signal transmitter unit is configured to transmit the transmission acknowledgement signal, when the number of retransmissions of the transmission data block reaches the maximum number of retransmissions, if a predetermined condition is satisfied.

6. The radio base station according to claim 4, wherein the transmission acknowledgement signal transmitter unit is configured never to transmit the transmission acknowledgement signal, when the maximum number of retransmissions is set to zero in the maximum number-of-retransmissions manager.

7. A mobile station, which is used in a mobile communication system in which a radio base station is configured to retransmit a transmission data block according to a transmission acknowledgement signal transmitted from the mobile station, the mobile station comprising:
- a maximum number-of-retransmissions manager unit configured to manage the maximum number of retransmissions of the transmission data block; and
- a transmission acknowledgement signal transmitter unit configured to transmit the transmission acknowledgement signal based on a reception result of the transmission data block, before the number of retransmissions of the transmission data block reaches the maximum number of retransmissions,
- wherein the transmission acknowledgement signal transmitter unit omits to transmit the transmission acknowledgement signal, when the number of retransmissions of the transmission data block reaches the maximum number of retransmissions.

8. The mobile station according to claim 7, wherein the transmission acknowledgement signal transmitter unit is configured to transmit the transmission acknowledgement signal, when the number of retransmissions of the transmission data block reaches the maximum number of retransmissions, if a predetermined condition is satisfied.

9. The mobile station according to claim 7, wherein the transmission acknowledgement signal transmitter unit is configured never to transmit the transmission acknowledgement signal, when the maximum number of retransmissions is set to zero in the maximum number-of-retransmissions manager.

* * * * *